United States Patent
Kamimura et al.

(10) Patent No.: US 6,798,604 B1
(45) Date of Patent: Sep. 28, 2004

(54) CONTROLLER CIRCUIT CONNECTABLE TO AN ACTUATOR DESIGNED TO POSITION A HEAD IN A RECORDING MEDIUM DRIVE ACCORDING TO A FILTERED POSITIONING CONTROL SIGNAL

(75) Inventors: Mitsuo Kamimura, Kawasaki (JP); Yoshinari Higashino, Kawasaki (JP); Kiyoshi Sakuma, Kawasaki (JP); Yukio Abe, Higashine (JP); Kunihiro Shimada, Kawasaki (JP); Atsushi Suzuki, Higashine (JP); Takeshi Hara, Kawasaki (JP); Kentaroh Katoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 431 days.

(21) Appl. No.: 09/696,833

(22) Filed: Oct. 26, 2000

(30) Foreign Application Priority Data

Jan. 7, 2000 (JP) .......................................... 2000-1757

(51) Int. Cl.⁷ .............................................. G11B 21/02
(52) U.S. Cl. .................... 360/75; 360/77.01; 360/77.03
(58) Field of Search .............................. 360/75, 77.01, 360/77.03; 318/560

(56) References Cited

U.S. PATENT DOCUMENTS 6,188,191 B1 * 2/2001 Frees et al. ................. 318/560
6,219,196 B1 * 4/2001 Semba et al. ................. 360/75

FOREIGN PATENT DOCUMENTS

JP 58224445 12/1983

* cited by examiner

Primary Examiner—David Hudspeth
Assistant Examiner—Jason Olson
(74) Attorney, Agent, or Firm—Greer, Burns & Crain, Ltd.

(57) ABSTRACT

The controller circuit is designed to generate the positioning control signal based on the positional deviation of the head from a target recording track on a recording medium. A feedback control is effected to position the head right on a trajectory corresponding to the target recording track based on the generated positioning control signal. The positioning control signal is subjected to filtering at a notch filter. The cutoff frequency of the notch filter is set depending on the temperature detected at a thermal sensor. Even when the resonant frequency shifts in response to variation in temperature, the cutoff frequency of the notch filter follows the shift of the resonant frequency. A narrower bandwidth of the cutoff frequency still achieves reduction in the amplitude of the frequency component corresponding to the resonant frequency. The resonance or continuous vibration can reliably be prevented in the head. A rapid response can be accomplished in positioning the head right on a trajectory corresponding to the target recording track because of a narrower bandwidth of the cutoff frequency.

20 Claims, 6 Drawing Sheets

CONTROLLER CIRCUIT CONNECTABLE TO AN ACTUATOR DESIGNED TO POSITION A HEAD IN A RECORDING MEDIUM DRIVE ACCORDING TO A FILTERED POSITIONING CONTROL SIGNAL

BACKGROUND OF THE INVENTION

1. Field of the Invention

The present invention relates to a controller circuit suitable to management of an actuator designed to position a head in a recording medium drive such as a hard disk drive (HDD) and the like.

2. Description of the Prior Art

A hard disk drive (HDD) in general includes a swinging carriage supporting a magnetic head assembly, and a voice coil motor as an actuator connected to the swinging carriage. The voice coil motor is designed to drive the swinging carriage for swinging movement in response to supply of an instructions signal specifying the controlled quantity of the swinging carriage. When the natural frequency of the swinging carriage matches with the frequency of the instructions signal, the HDD suffers from a continuous vibration of the swinging carriage. This phenomenon is in general called resonance. As disclosed in Japanese Patent Application Laid-open No. 5-159492, for example, a notch filter can be added to a controller circuit to attenuate the amplitude of a resonant frequency component in the instructions signal output from the controller circuit. The notch filter is supposed to suppress or totally prevent a continuous vibration of the swinging carriage supporting the magnetic head assembly.

In the conventional controller circuit, the cutoff frequency of a broader bandwidth should be set in the notch filter. The cutoff frequency over a broader band tends to induce a phase shift between the instructions signal supplied to the voice coil motor and the positional information signal output from the magnetic read/write head included in the magnetic head assembly. The positional information signal is output to specify the actual position of the read/write head. The aforementioned phase shift is supposed to deteriorate the response in positioning the magnetic read/write head right on a trajectory corresponding to the target recording track on a magnetic disk. It is accordingly preferable that the cutoff frequency of a narrower bandwidth can be set in the notch filter.

SUMMARY OF THE INVENTION

It is accordingly an object of the present invention to provide a controller circuit connectable to an actuator designed to position a head in a recording medium drive, capable of reliably preventing generation of resonance with the cutoff frequency of a narrower bandwidth.

According to a first aspect of the present invention, there is provided a controller circuit connectable to an actuator designed to position a head in a recording medium drive, comprising: a control signal output circuit designed to output a positioning control signal for the actuator; a filter designed to subject the positioning control signal to filtering based on a predetermined cutoff frequency; a thermal sensor detecting temperature; and a cutoff frequency determining circuit designed to determine the predetermined cutoff frequency for the filter based on the temperature.

The controller circuit is designed to generate the positioning control signal based on the positional deviation of the head from a target recording track on a recording medium. A feedback control is effected to position the head right on a trajectory corresponding to the target recording track based on the generated positioning control signal. In this case, the positioning control signal subjected to filtering serves to attenuate or reduce the amplitude of the frequency component, in the positioning control signal, corresponding to the resonant frequency to the natural frequency related to the head. A suitable cutoff frequency may be selected in the filter so as to properly reduce the amplitude of the frequency component corresponding to a measured resonant frequency in the positioning control signal.

In effecting filtering, the cutoff frequency is set in the filter based on the temperature. Accordingly, if the resonant frequency shifts in response to variation in the temperature, the cutoff frequency of the filter is allowed to follow the shift of the resonant frequency. In this case, a narrower bandwidth of the cutoff frequency still reliably achieves the reduction in the amplitude of the frequency component corresponding to the resonant frequency. The resonance or continuous vibration can reliably be prevented in the head. A rapid response can be accomplished in positioning the head right on a trajectory corresponding to the target recording track because of a narrower bandwidth of the cutoff frequency.

According to a second aspect of the present invention, there is provided a recording medium drive comprising: a head; a support member supporting the head; an actuator designed to drive the support member based on an electric current so as to position the head; a filter circuit designed to subject the electric current to filtering based on a predetermined cutoff frequency; a thermal sensor detecting temperature; and a cutoff frequency determining circuit designed to determine the predetermined cutoff frequency for the filter circuit based on the temperature.

Likewise, the amplitude of the frequency component corresponding to the resonant frequency in the positioning control signal can be reduced after the filtering in the recording medium drive. When the thus filtered positioning control signal is supplied to the actuator, an excessive or continuous vibration caused by resonance can be prevented in the head. Moreover, since the specific cutoff frequency is determined in the filter based on the temperature detected at the thermal sensor, a narrower bandwidth of the cutoff frequency still reliably achieves reduction in the amplitude of the frequency component corresponding to a specific resonant frequency in the positioning control signal in the aforementioned manner.

The aforementioned controller circuit can be realized with a microcomputer, a digital signal processor (DSP), or the like, for example. The microcomputer or DSP may be designed to effect a method comprising: generating a positioning control signal based on a positional deviation of a head from a target recording track; subjecting said positioning control signal to filtering based on a predetermined cutoff frequency; and setting said predetermined cutoff frequency based on a signal specifying a temperature when effecting said filtering.

Such a method can be realized with a computer program stored in a memory chip, said program comprising: computer program code causing an MPU or DSP to calculate a controlled quantity for positioning a head with respect to a recording medium based on a positional deviation of said head from a target recording track; computer program code causing said MPU or DSP to subject said controlled quantity to filtering based on a predetermined cutoff frequency; and computer program code causing said MPU or DSP to set said predetermined cutoff frequency based on a signal specifying a temperature when effecting said filtering. The computer program may be installed into the memory chip through any type of portable computer-readable storage medium, such as a diskette (FD), a compact disk (CD), and the like.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
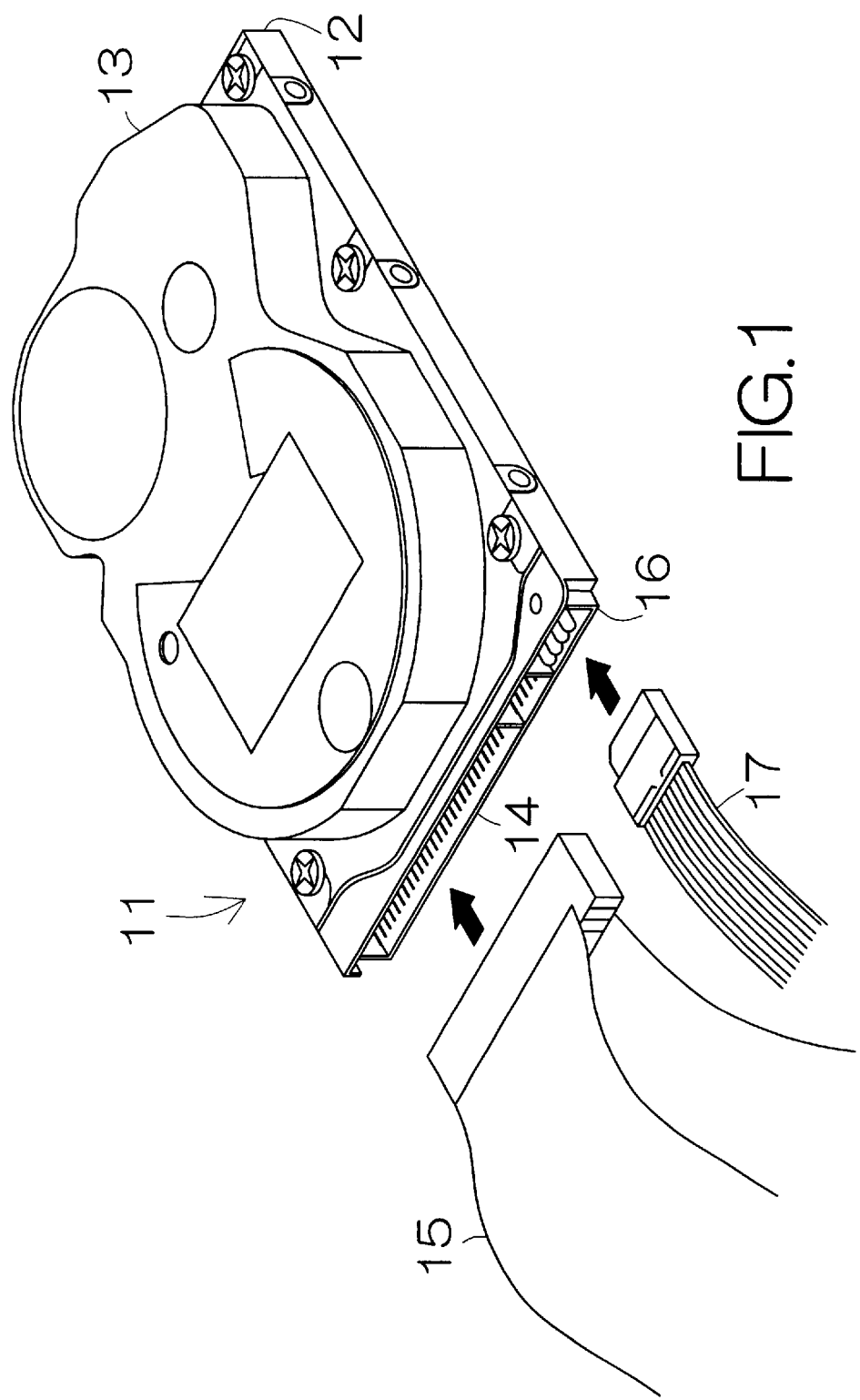
FIG. 1 is a perspective view schematically illustrating an overall structure of a hard disk drive (HDD)

FIG. 1 illustrates a hard disk drive (HDD) 11 as an example of a magnetic recording medium drive. The HDD 11 includes a base plate 12 and a cup-shaped enclosure cover 13 received and coupled on the planar upper surface of the base plate 12 so as to define an inner closed space between the base plate 12 and the enclosure cover 13 itself. The enclosure cover 13 may be formed from a thin metallic plate, such as an aluminum or steel plate, by deep drawing, for example. The HDD 11 may be assembled within a computer housing, not shown, of a workstation, a personal computer, or the like. Otherwise, the HDD 11 may be constructed as an exterior storage device independent of a housing of a computer.

A printed circuit board, not shown, is attached on the back or down-faced surface of the base plate 12. An HDD control circuit is constructed on the printed circuit board. The HDD control circuit is designed to control the operation of the HDD 11, as described later in detail. A signal connector 14 is connected to the HDD control circuit mounted on the surface of the printed circuit board. The signal connector 14 is designed to establish a parallel interface such as an IDE, an SCSI, or the like. When a signal cable 15 extending from a motherboard of a computer is coupled to the signal connector 14, a data transmission path is established between the HDD control circuit and the motherboard. The HDD control circuit may receive an electric power through a power supply connector 16. A power supply cable 17 extending from a power source of a computer is coupled to the power supply connector 16.

Figure 2:
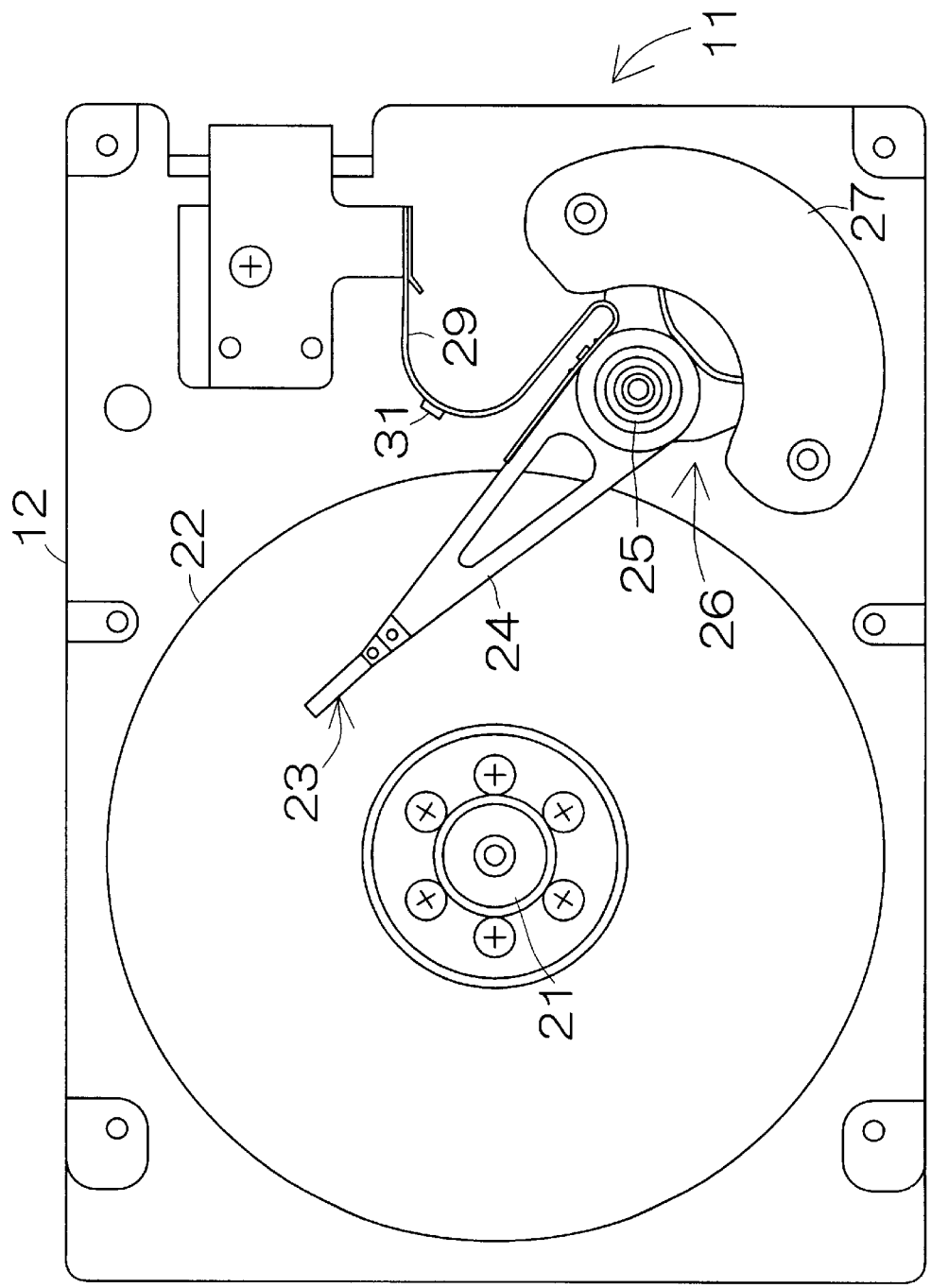
FIG. 2 is a plan view schematically illustrating the inner structure of the HDD.

As shown in FIG. 2, a spindle motor 21 is mounted on the upper surface of the base plate 12. At least a magnetic recording medium or disk 22 is mounted on the drive shaft of the spindle motor 21. The spindle motor 21 serves to drive the magnetic disk 22 around the vertical rotational axis. In addition, a support or carriage arm 24 is likewise set on the upper surface of the base plate 12 so as to support a magnetic head assembly, including a magnetic read/write head 23, at the tip end. When the enclosure cover 13 is coupled to the upper surface of the base plate 12, the magnetic disk 22, the magnetic head assembly and the carriage arm 24 can airtightly be enclosed within the inner closed space defined between the base plate 12 and the enclosure cover 13.

The carriage arm 24 is allowed to swing around a support shaft 25. When the carriage arm 24 swings, the magnetic read/write head 23 is caused to move across recording tracks on the magnetic disk 22 in the radial direction of the magnetic disk 22. The radial movement allows the magnetic read/write head 23 to be positioned right on a trajectory corresponding to the target recording track. In this manner, the magnetic read/write head 23 is allowed to achieve the reading/writing operations on the target recording track.

The magnetic read/write head 23 comprises a thin film magnetic head element designed to write binary data or any information data into the magnetic disk 22 and a magnetoresistive element designed to read binary data or any information data out of the magnetic disk 22. A thin film coil pattern may be employed to generate a recording magnetic field in the thin film magnetic head element, for example. A giant magnetoresistive (GMR) element or a tunnel-junction magnetoresistive (TMR) element may be employed as a magnetoresistive element, for example.

As conventionally known, the magnetic read/write head 23 is in general formed on a head slider, not shown, as a component of the magnetic head assembly. The head slider is supported at the tip end of an elastic suspension cantilevered at the tip end of the carriage arm 24. The head slider may be designed to fly above the surface of the magnetic disk 22 during rotation of the magnetic disk 22 by receiving an airflow generated along the rotating magnetic disk 22. In this case, the aforementioned thin film magnetic head element and magnetoresistive element realize reading/writing operations, respectively, above the surface of the magnetic disk 22 during the flight of the head slider. The head slider is generally designed to receive an urging force adapted to urge the head slider toward the surface of the magnetic disk 22 from the aforementioned elastic suspension.

Figure 3:
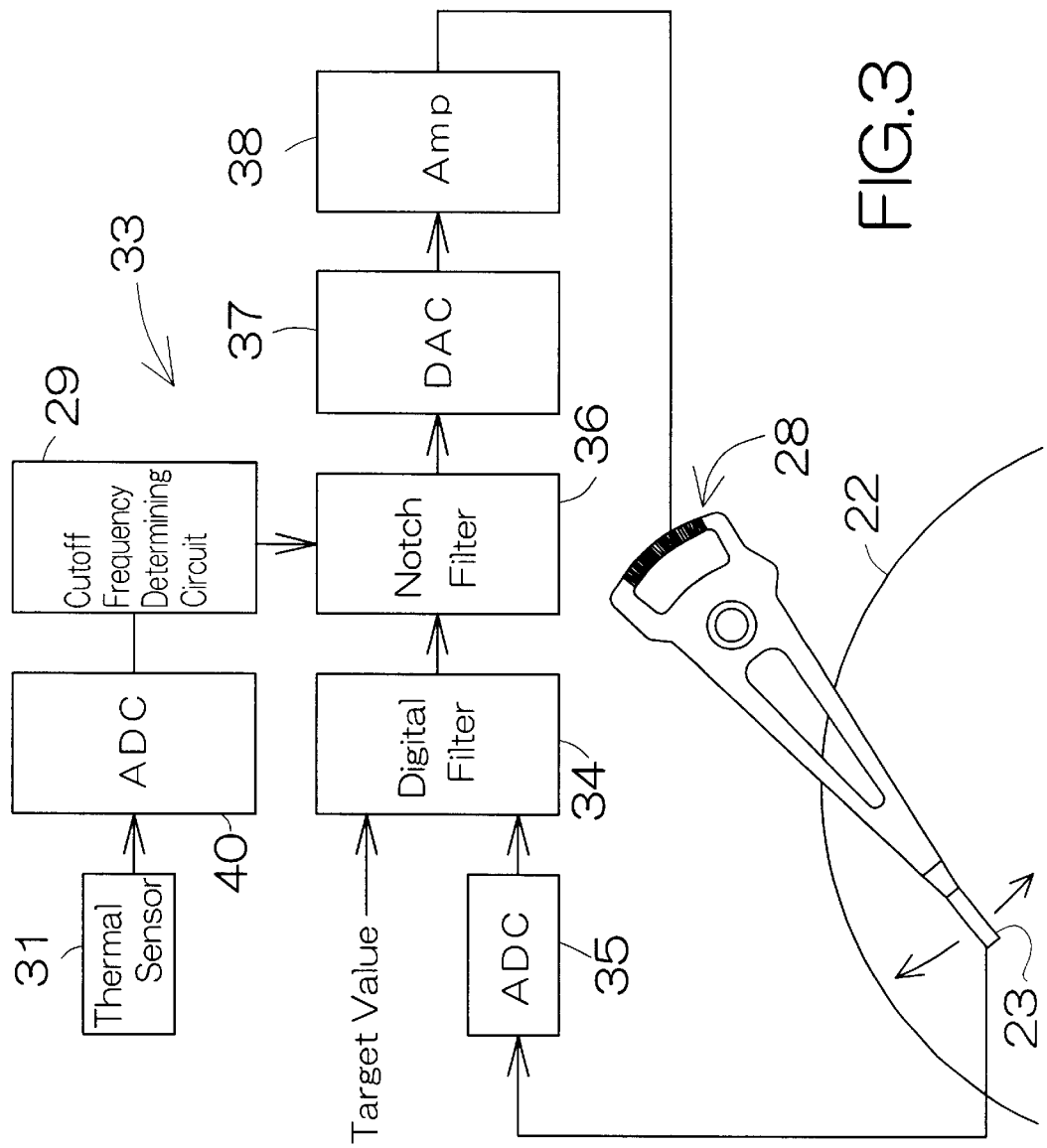
FIG. 3 is a block diagram schematically illustrating the structure of an actuator controller circuit according to an example.

An actuator, namely, a voice coil motor 26 is connected to the carriage arm 24. The voice coil motor 26 is designed to exhibit a driving force to induce the swinging movement of the carriage arm 24. The voice coil motor 26 comprises a stator, not shown, fixed on a stationary support plate 27. The stator is designed to generate a stable or stationary magnetic field. A coil 28 is wound around the carriage arm 24, as shown in FIG. 3, for example, and disposed within the stable magnetic field generated by the stator. As conventionally known, the coil 28 generates the driving force in response to a supplied electric current.

A flexible printed circuit board (FPC) 29 extending from the back surface of the printed circuit board is connected to the carriage arm 24. A thermal sensor 31 is mounted on the surface of the FPC 29 for detecting temperature. The thermal sensor 31 is designed to linearly vary the voltage value of its output in accordance with variation in temperature. In addition, a write management circuit, not shown, is constructed on the surface of the FPC 29 for controlling the writing operation of the magnetic read/write head 23, while a read management circuit, not shown, is likewise constructed on the surface of the FPC 29 for controlling the writing operation of the magnetic read/write head 23. A thin film conductive or printed pattern, not shown, is formed on the carriage arm 24 so as to establish a signal transmission path between the read and write management circuits and the thin film magnetic head and magnetoresistive elements, respectively.

As shown in FIG. 3, an actuator controller circuit 33 is assembled within the HDD control circuit for controlling the driving force generated at the voice coil motor 26, for example. The actuator controller circuit 33 comprises a digital filter 34 as a control signal output circuit for outputting an instructions signal for positioning the magnetic read/write head 23, based on the positional deviation of the magnetic read/write head 23 with respect to a specific target recording track. This instructions signal corresponds to a positioning control signal of the invention. The digital filter 34 is designed to determine the difference between the target value, specified in the instructions signal supplied from a host computer, for example, to the HDD control circuit, and the actual value, specified in the positional information signal output from the magnetic read/write head 23. The difference is then output as the instructions signal for positioning the magnetic read/write head 23. The positional information signal specifying the actual position of the magnetic read/write head 23 is first supplied to an analog/digital converter (ADC) 35 through the aforementioned read management circuit, not shown. The ADC 35 is designed to convert an analog signal representing the actual position of the magnetic read/write head 23 into a digital signal.

A notch filter 36 is connected to the digital filter 34 for effecting filtering on the instructions signal. The notch filter 36 is designed to reduce or attenuate the amplitude of a specific cutoff frequency determined based on a resonant frequency included in the instructions signal. The resonant frequency can be derived based on the natural frequency of the carriage 24, for example. A digital/analog converter (DAC) 37 converts the instructions signal in the filtered digital form into the analog form. An amplifier 38 is designed to amplify the analog signal output from the DAC 37. The instructions signal in the form of the amplified analog signal is finally supplied to the voice coil motor 28.

A cutoff frequency determining circuit 39 is connected to the notch filter 36 for determining or setting the cutoff frequency of the notch filter 36 based on the temperature detected at the thermal sensor 31. The cutoff frequency determining circuit 39 is designed to determine the cutoff frequency $f_1$–$f_2$ for respective predetermined ranges of the temperature in accordance with the following Table 1, for example.

TABLE 1

| Temperature Range [° C.] | Cutoff Frequency [Hz] |
|---|---|
| 0 T < 20 | $f_1$ |
| 20 T < 40 | $f_2$ |
| 40 T < 60 | $f_3$ |
| 60 T < 80 | $f_4$ |
| 80 T < 100 | $f_5$ |

The analog/digital converter (ADC) 40 converts the analog signal specifying the output voltage value of the thermal sensor 31 into a digital signal.

As conventionally known, the transfer function H(s) of the notch filter 36 can be expressed as follows:

[Equation 1]

$$H(s) = \frac{s^2 + P_z \cdot P_w \cdot s + P_w^2}{s^2 + P_d \cdot P_z \cdot P_w \cdot s + P_w^2} \quad (1)$$

where
[Equation 2]

$$Pw = 2\pi f \quad (2)$$

Figure 4:
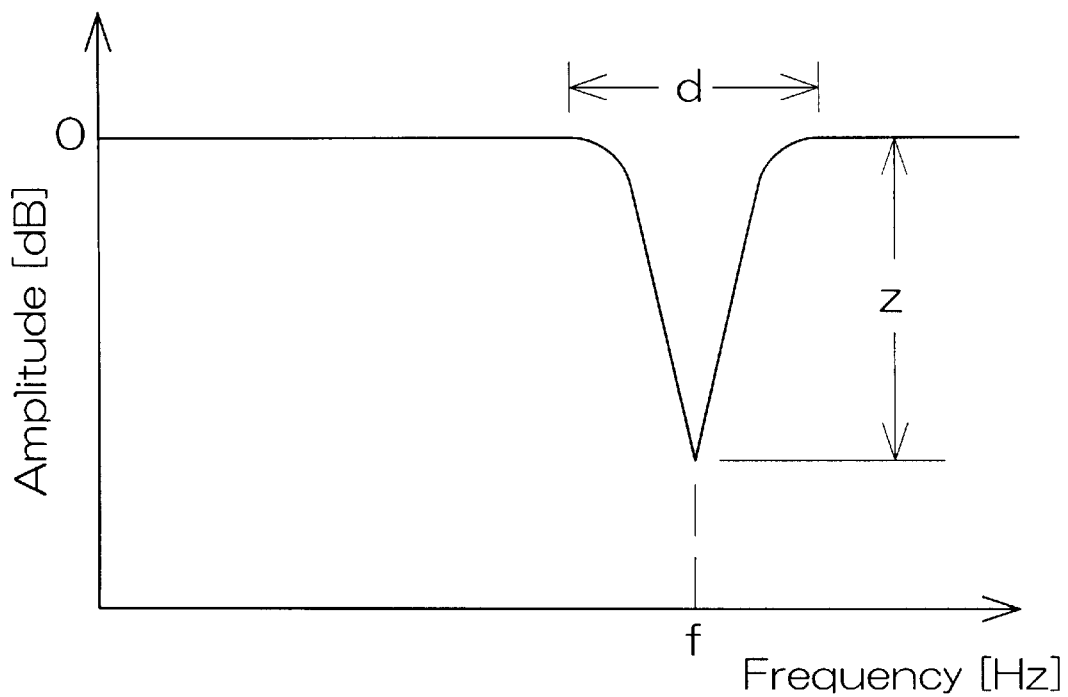
FIG. 4 is a graph illustrating the filtering characteristic curve of a notch filter.

According to the transfer function H(s), the amplitude can be attenuated at the specific cutoff frequency f, as shown in FIG. 4, for example. A notch appears in the filtering characteristic curve at the specific cutoff frequency f. The notch can also be defined by its bandwidth d and its depth z specifying the degree or magnitude of the attenuation. The bandwidth d and notch depth z can optionally be set by manipulating the parameters Pd, Pz.

In the case where a digital filter is employed as the notch filter 36, the following relationship may be established between an input signal Y(n) and an output signal U(n):
[Equation 3]

$$U(n)=A_0 \cdot Y(n)+A_1 \cdot Y(n-1)+A_2 \cdot Y(n-2)-B_1 \cdot U(n-1)-B_2 \cdot U(n-2) \quad (3)$$

Determination of filter coefficients $A_0$, $A_1$, $A_2$, $B_1$ and $B_2$ in the Equation 3 is very useful to adjustment of the notch, specifically, a shift of the cutoff frequency f, as well as determination of the bandwidth d and notch depth z.

Figure 5:
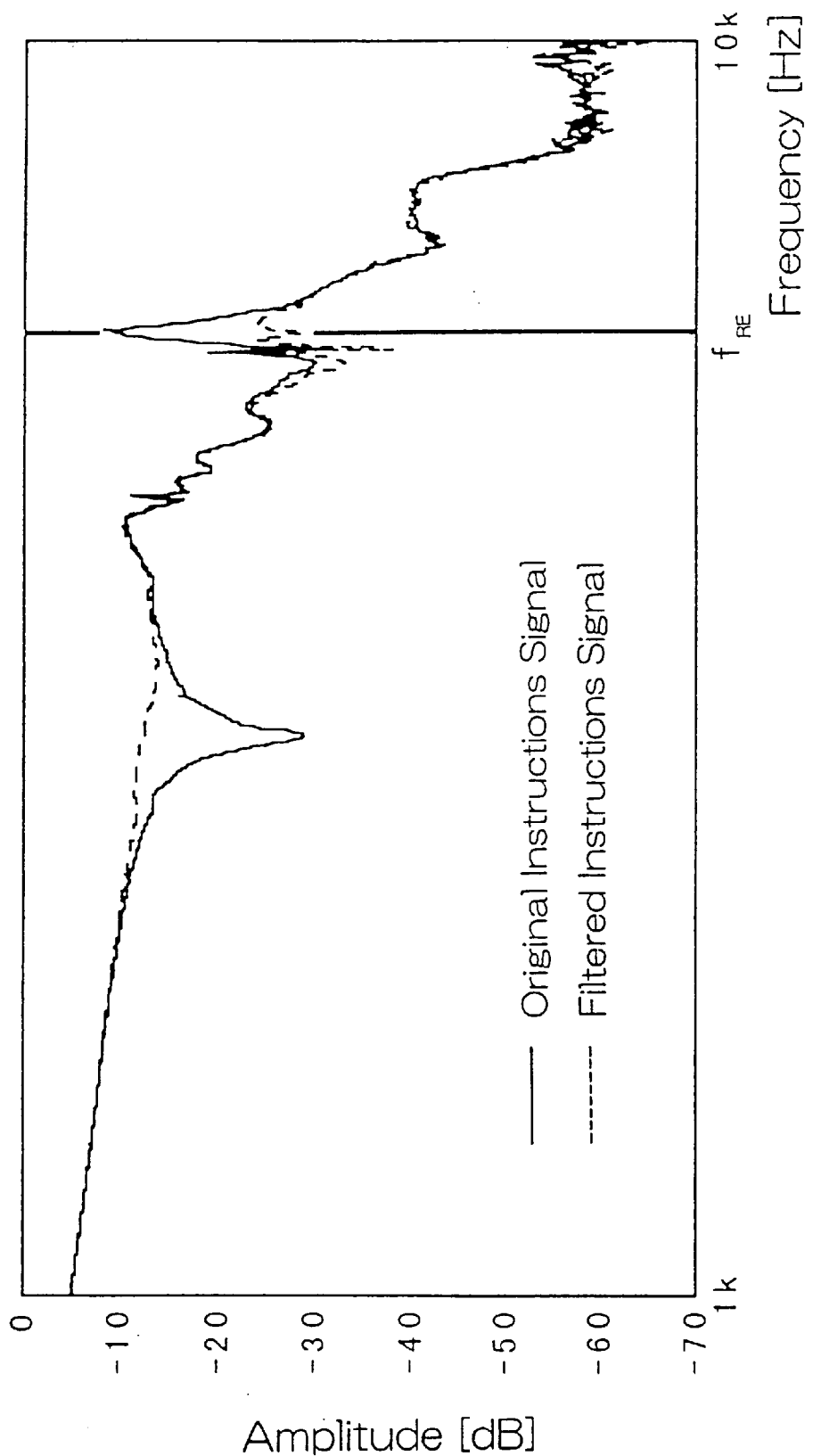
FIG. 5 is a graph illustrating the difference between the original instructions signal and the filtered instructions signal.

The present inventors have actually observed the characteristic or performance of the notch filter 36. In observation, a specific instructions signal was supplied to the voice coil motor 26 from the amplifier 38. As shown in FIG. 5, it has been observed that a specific resonant frequency $f_{RE}$ appears in the instructions signal. When appropriate filter coefficients $A_0$, $A_1$, $A_2$, $B_1$ and $B_2$ are set in the notch filter 36, reduction or attenuation can be achieved in the amplitude of the frequency component corresponding to the resonant frequency $f_{RE}$ in the instructions signal output from the notch filter 36. Specifically, the notch filter 36 serves to make the amplitude curve for the instructions signal smoother without an extreme variation. Reduction in the amplitude at the resonant frequency $f_{RE}$ in this manner contributes to a reliable prevention or avoidance of an excessive and continuous vibration of the carriage arm 24, namely, of the magnetic read/write head 23.

Figure 6:
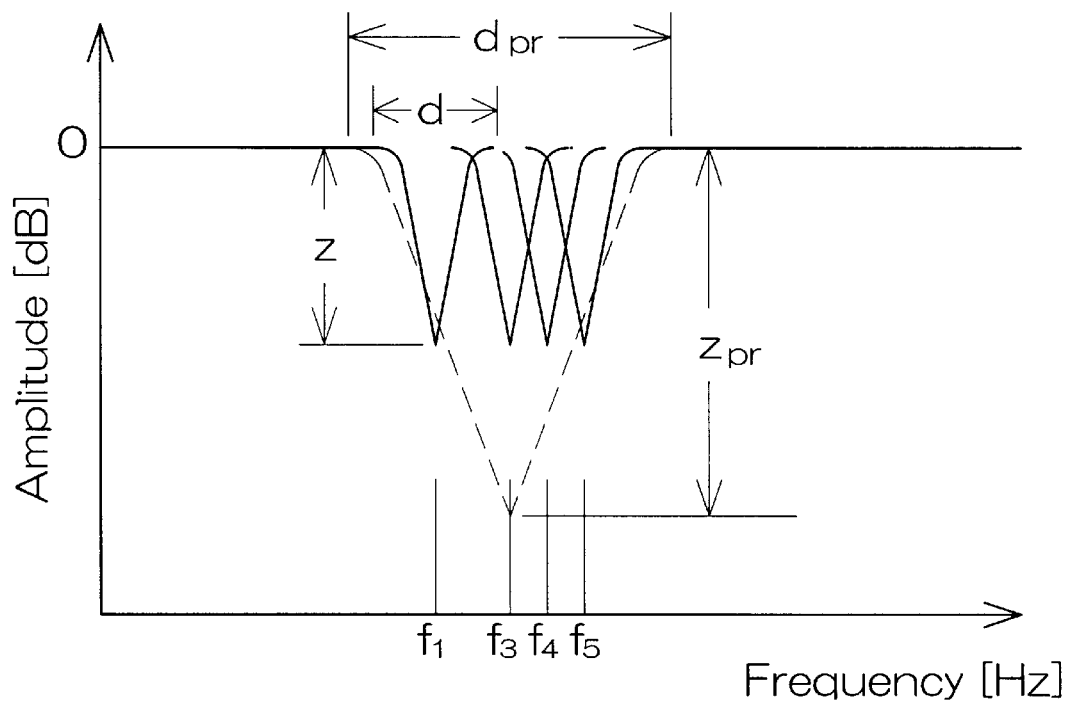
FIG. 6 is a graph schematically illustrating cutoff frequencies variable dependent on variation in temperature.

When the environmental temperature of the HDD 11 varies, the resonant frequency $f_{RE}$ shifts in the instructions signal. In the notch filter 36, an appropriate cutoff frequency $F_1$–$f_5$ is set depending upon the temperature detected at the thermal sensor 31 in accordance with the aforementioned Table 1. As shown in FIG. 6, for example, it is possible to reduce the bandwidth d and the notch depth z of the notch for the respective cutoff frequencies $f_1$–$f_5$. On the other hand, if a single cutoff frequency is set to cover over the overall temperature ranging 0° C. to 100° C. (not inclusive), as is apparent from FIG. 6, the notch should have a broader bandwidth $d_{PR}$ and a larger notch depth $z_{PR}$. Enlargement of the bandwidth $d_{PR}$ and the notch depth $z_{PR}$ leads to an enlarged phase shift generated between the instructions signal supplied to the voice coil motor 26 and the positional information signal specifying the actual position of the magnetic read/write head 23. On the other hand, reduction in the bandwidth d and the notch depth z enables a rapid response in positioning the magnetic read/write head 23 right on a trajectory corresponding to the target recording track.

Figure 7:
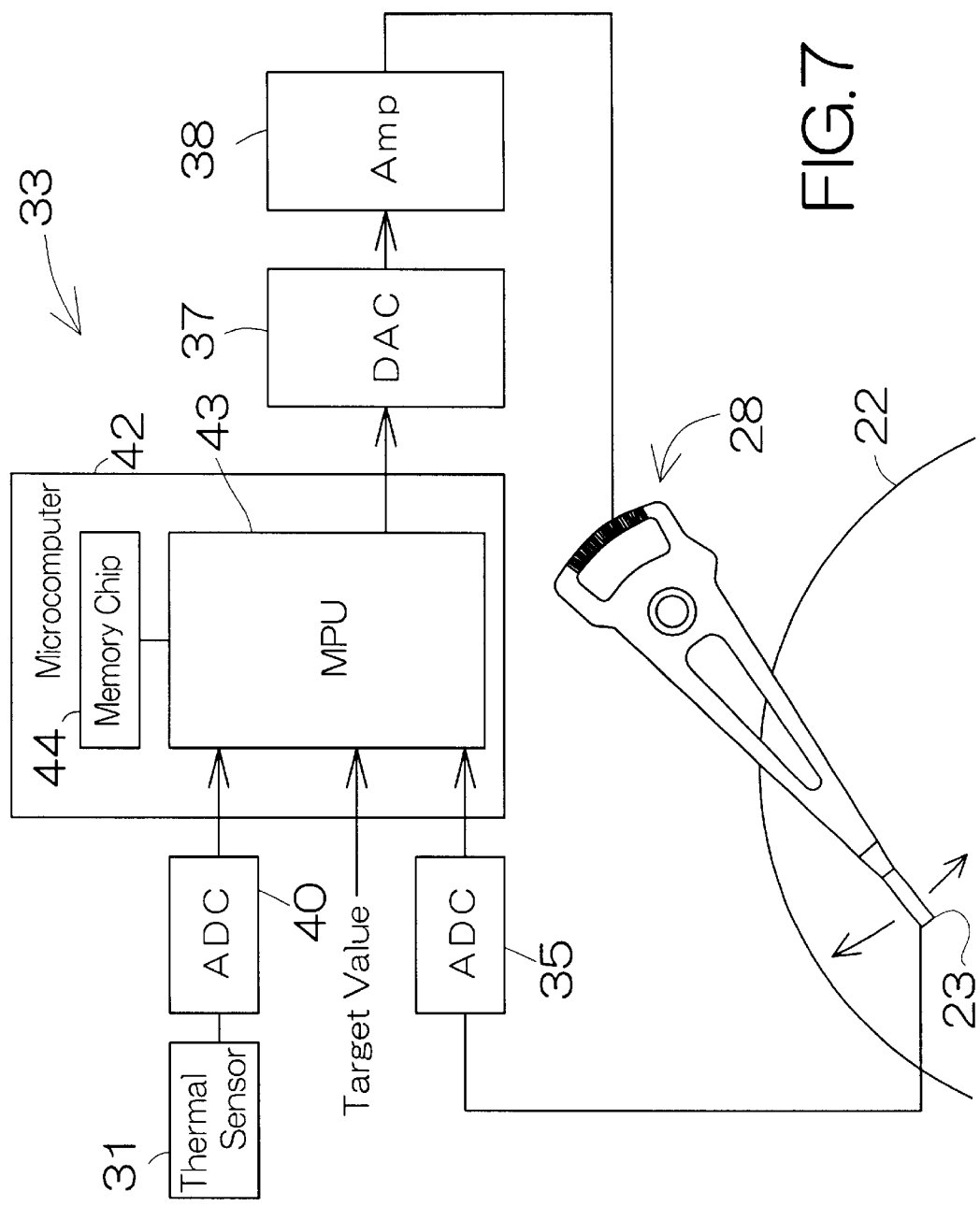
FIG. 7 is a block diagram schematically illustrating the structure of an actuator controller circuit according to another example.

As shown in FIG. 7, a microcomputer 42 may take the place of the combination of the aforementioned digital filter 34, notch filter 36 and cutoff frequency determining circuit 39, for example. The microcomputer 42 may include a microprocessor unit (MPU) 43 and a memory chip 44 connected to the MPU 43. The MPU 43 is designed to operate in accordance with a firmware stored in the memory chip 44, for example. The memory chip 44 can be selected from any type of a read only memory (ROM) or a random access memory (RAM), for example. The firmware can be installed into the memory chip 44 from a portable recording medium such as a diskette (FD), a compact disk (CD), and the like.

The MPU 43 operates to calculate the controlled quantity Y(n) for positioning the magnetic read/write head 23 based on the positional deviation of the magnetic read/write head 23 from a trajectory corresponding to a target recording track. The controlled quantity Y(n) may be expressed by the difference between the target value, specified in the instructions signal supplied from a host computer, for example, and the actual value, specified in the positional information signal output from the magnetic read/write head 23.

Subsequently, the MPU 43 operates to effect filtering on the calculated controlled quantity Y(n). The MPU 43 is designed to calculate the filtered controlled quantity U(n) in accordance with the aforementioned Equation 3. In calculation, the MPU 43 obtains filter coefficients $A_0$, $A_1$, $A_2$, $B_1$ and $B_2$ out of the memory chip 4.

The filter coefficients $A_0$, $A_1$, $A_2$, $B_1$ and $B_2$ are stored in the memory chip 44 for the respective cutoff frequencies $f_1$–$f_5$ in the aforementioned manner. The MPU 43 is designed to obtain an appropriate set of filter coefficients $A_0$, $A_1$, $A_2$, $B_1$ and $B_2$ dependent on the temperature detected at the thermal sensor 31. The output of the thermal sensor 31 may periodically be supplied to the MPU 43, for example, in a specific cycle. The amplitude can be reduced in the controlled quantity U(n) after filtering at the frequency of a bandwidth including a specific cutoff frequency $f_1$–$f_5$ The magnetic read/write head 23 is prevented from suffering from an excessive and continuous vibration.

It should be noted that the notch filter 36 can be replaced with any type of a filter or any combination of filters for attenuating the amplitude of the frequency component corresponding to a resonant frequency in the above-described actuator controller circuit 33. In addition, a set of analog filters can be employed to change or modify the cutoff frequency of filtering. In this case, an appropriate analog filter is selected depending on the ranges of the temperature.

What is claimed is:

1. A controller circuit connectable to an actuator designed to position a head in a recording medium drive, comprising:
    a control signal output circuit designed to output a positioning control signal for said actuator;
    a notch filter designed to attenuate an amplitude of a frequency component corresponding to a cutoff frequency in the positioning control signal based on a notch in a filtering characteristic curve, said notch taking a variable bandwidth and a variable depth;
    a thermal sensor detecting temperature; and
    a cutoff frequency determining circuit designed to determine said cutoff frequency for said notch filter based on said temperature, said cutoff frequency determining circuit determining the bandwidth and the depth of the notch based on said temperature.

2. The controller circuit according to claim 1, wherein said cutoff frequency determining circuit manipulates parameters Pd and Pz in a transfer function of the notch filter, said transfer function expressed as follows:

$$H(s)=(s^2+Pz \cdot Pw \cdot s+Pw^2)/(s^2+Pd \cdot Pz \cdot Pw \cdot s+Pw^2)$$

where $$Pw=2\pi f \text{ and } s=j2\pi f$$

where f indicates the cutoff frequency, and $j=-1$.

3. The controller circuit according to claim 2, assembled within the recording medium drive, the drive including:
    said head;
    a support member supporting said head; and
    said actuator designed to drive said support member based on said positioning control signal so as to position said head.

4. The controller circuit according to claim 3, wherein said recording medium drive is a hard disk drive.

5. The controller circuit according to claim 1, wherein said cutoff frequency determining circuit operates to select said cutoff frequency from a data table defining a set of cutoff frequencies for respective ranges of temperature.

6. The controller circuit according to claim 5, assembled within the recording medium drive, the drive including:
    said head;
    a support member supporting said head; and
    said actuator designed to drive said support member based on said positioning control signal so as to position said head.

7. The controller circuit according to claim 6, wherein said recording medium drive is a hard disk drive.

8. The controller circuit according to claim 1, wherein said control signal output circuit, the filter and the cutoff frequency determining circuit are integrated into any of a microcomputer and a digital signal processor.

9. The controller circuit according to claim 8, assembled within the recording medium drive, the drive including:
    said head;
    a support member supporting said head; and
    said actuator designed to drive said support member based on said positioning control signal so as to position said head.

10. The controller circuit according to claim 9, wherein said recording medium drive is a hard disk drive.

11. The controller circuit according to claim 1, wherein said notch filter is a digital filter designed to establish $$U(n)=A_0 \cdot Y(n)+A_1 \cdot Y(n-1)+A_2 \cdot Y(n-2)-B_1 \cdot U(n-1)-B_2 \cdot U(n-2)$$

between input signals Y(n), Y(n−1), and Y(n−2) and output signals U(n), U(n−1), and U(n−2) and said cutoff frequency determining circuit determines filter coefficients $A_0$, $A_1$, $A_2$, $B_1$, and $B_2$ of the notch filter.

12. The controller circuit according to claim 11, wherein said digital filter is a microcomputer or a digital signal processor.

13. The controller circuit according to claim 1, wherein the notch filter is a digital filter defined by a plurality of filter coefficients, and the cutoff frequency determining circuit sets all of the plurality of filter coefficients to determine said cutoff frequency and the bandwidth and the depth of the notch based on said temperature.

14. The controller circuit according to claim 1, wherein the cutoff frequency determining circuit is designed to control the bandwidth and the depth of the notch filter so as to establish the filtering characteristic curve corresponding to the temperature.

15. A method of controlling an actuator in a recording medium drive, comprising:
    generating a positioning control signal based on a positional deviation of a head from a target recording track;

attenuating an amplitude of a frequency component corresponding to a cutoff frequency in said positioning control signal based on a notch in a filtering characteristic curve, said notch taking a variable bandwidth and a variable depth; and determining said cutoff frequency and bandwidth and depth of the notch based on a signal specifying a temperature when attenuating the amplitude of the frequency component.

16. The method of controlling according to claim 15, further comprising manipulating parameters Pd and Pz in a transfer function of a notch filter having the filtering characteristic curve, said transfer function expressed as follows:

$$H(s)=(s^2+Pz \cdot Pw \cdot s+Pw^2)/(s^2+Pd \cdot Pz \cdot Pw \cdot s+Pw^2)$$

where $$Pw=2\pi f \text{ and } s=j2\pi f$$

where f indicates the cutoff frequency, and j=−1.

17. The method of controlling according to claim 16, wherein said predetermined cutoff frequency is selected from a data table defining a set of cutoff frequencies for respective ranges of temperature.

18. A computer-readable storage medium containing program instructions for generating a filtered controlled quantity for positioning a head in a recording medium drive, comprising:

a computer program code causing a computer to calculate a controlled quantity for positioning a head with respect to a recording medium based on a positional deviation of said head from a target recording track;

a computer program code causing said computer to attenuate an amplitude of a frequency component corresponding to a cutoff frequency in said controlled quantity based on a notch in a filtering characteristic curve, said notch taking a variable bandwidth and a variable depth; and a computer program code causing said computer to determine said cutoff frequency and bandwidth and depth of the notch based on a signal specifying a temperature when attenuating the amplitude of the frequency component.

19. The computer-readable storage medium according to claim 18, further comprising a computer program code causing said computer to manipulate parameters Pd and Pz in a transfer function of a notch filter having the filtering characteristic curve, said transfer function expressed as follows:

$$H(s)=(s^2+Pz \cdot Pw \cdot s+Pw^2)/(s^2+Pd \cdot Pz \cdot Pw \cdot s+Pw^2)$$

where $$Pw=2\pi f \text{ and } s=j2\pi f$$

where f indicates the cutoff frequency, and j=−1.

20. The computer-readable storage medium according to claim 19, further comprising a computer program code causing said computer to select said predetermined cutoff frequency from a data table defining a set of cutoff frequencies for respective ranges of temperature.

* * * * *